United States Patent [19]

Graton

[11] Patent Number: 4,941,860
[45] Date of Patent: Jul. 17, 1990

[54] COAXIAL TORSION DAMPER, PARTICULARLY FOR AUTOMOTIVE VEHICLES

[75] Inventor: Michel Graton, Paris, France

[73] Assignee: VALEO, Paris, France

[21] Appl. No.: 295,459

[22] Filed: Jan. 10, 1989

[30] Foreign Application Priority Data

Jan. 13, 1988 [FR] France ............................ 88 00291

[51] Int. Cl.⁵ ............................................. F16D 3/14
[52] U.S. Cl. ................................ 464/68; 192/106.2; 464/64
[58] Field of Search .......................... 192/106.1, 106.2; 464/64, 66, 67, 68

[56] References Cited

U.S. PATENT DOCUMENTS

| 2,042,570 | 6/1936 | Wemp | 192/106.2 |
| 3,128,640 | 4/1964 | Zeidler | 74/574 |
| 3,995,726 | 12/1976 | De Gennes | 464/68 X |
| 4,014,423 | 3/1977 | Werner et al. | 464/68 X |
| 4,485,907 | 12/1984 | Nishimura | 464/68 X |
| 4,493,673 | 12/1985 | Anders et al. | 464/66 |
| 4,643,287 | 2/1987 | Lech, Jr. | 192/106.2 |
| 4,690,257 | 9/1987 | Suzuki et al. | 192/106.2 X |
| 4,782,933 | 11/1988 | Jackel et al. | 192/106.2 X |

FOREIGN PATENT DOCUMENTS 2361575 3/1978 France .
2124734 2/1984 United Kingdom .

Primary Examiner—Daniel P. Stodola
Attorney, Agent, or Firm—Charles E. Brown; Charles A. Brown

[57] ABSTRACT

A torsion damper which comprises a pair of guide rings connected together by spacers, a disc and a damper plate. The damper plate is mounted coaxially within a space delimited by the disc. A passageway is provided in the disc for receiving the spacers. The passageway consists of an aperture which is formed partly in an inner periphery of disc and in an outer periphery of the damper plate.

6 Claims, 3 Drawing Sheets

COAXIAL TORSION DAMPER, PARTICULARLY FOR AUTOMOTIVE VEHICLES

FIELD OF THE INVENTION

The present invention is concerned generally with torsion dampers, particularly for automotive vehicles.

BACKGROUND OF THE INVENTION

In U.S. Pat. No. 3,128,640, a torsion damper of the kind generally called a coaxial or concentric torsion damper is described. In that damper, the torque is transmitted from a disc to a pair of rings known as guide rings, by means of a first spring damping device, the torque being transmitted from the guide rings to a damper or hub plate through a second spring damping device.

The friction associated with the damper plate is controlled by means of spacers which connect the guide rings to each other and pass through passage means formed in the disc.

The friction between the disc and the damper plate is controlled through the thickness of the damper plate by means of plates fixed to the disc and connected to each other by riveting.

Because of he localisation of the spacers at the outer periphery of the guide rings, such an arrangement leads to some deformation of the guide rings. The length of the guide rings is considerable, such that, being weakened at their outer periphery by the spacers, they have a tendency when in contact with the damper plate to move apart or spread at their inner periphery, which is detrimental to the friction effect.

In addition, the spacers and the rivets are generally disposed all on the same pitch circle as the openings which are formed in the disc for accommodating the springs. As a result, and with particular relevance to the question of mechanical strength of the disc, the spacing between the two damping devices cannot be made as large as is desirable.

SUMMARY OF THE INVENTION

An object of the present invention is to reduce these disadvantages, and thus to provide a coaxial type torsion damper of large displacement, which is provided with guide rings of reduced deformation, while at the same time obtaining other advantages.

More precisely, according to the invention a torsion damping device of the kind described above is characterised in that the passage means comprises, in respect of each of the spacers, an aperture formed partly in the inner periphery of the disc and partly in the outer periphery of the damper plate.

The invention makes it possible to increase the displacement between the disc and the damper plate, as well as increase the number of springs in the disc. The deformation of the guide rings is minimised, because the spacers are closer to the zone in which friction between the guide rings and the damper plate is produced.

According to another feature of the invention, the spacers may carry, at least partly, the same friction means as are associated with the disc.

Advantageously, due to the localisation of the spacers, one common friction means may serve both for the disc and for the damper plate, and may be carried by the spacers.

In one embodiment, the aperture is defined by a notch formed in the inner periphery of the disc and by a notch formed in the outer periphery of the damper plate, the two notches being offset from each other circumferentially. Alternating pads are thus provided.

The spacers can come into abutting engagement on the pads of the disc, while the pads of the damper plate can come into abutting engagement on the spacers at the appropriate time. As a result, the springs associated with the second damping device may be arranged to operate by themselves over a small part of the relative displacement between the disc and the damper plate. The opposite situation is also possible.

The features and advantages of the invention will appear more clearly from the description which follows. This description is given by way of example and with reference to the accompanying diagrammatic drawings.

DESCRIPTION OF A PREFERRED EMBODIMENT

Figure 1:
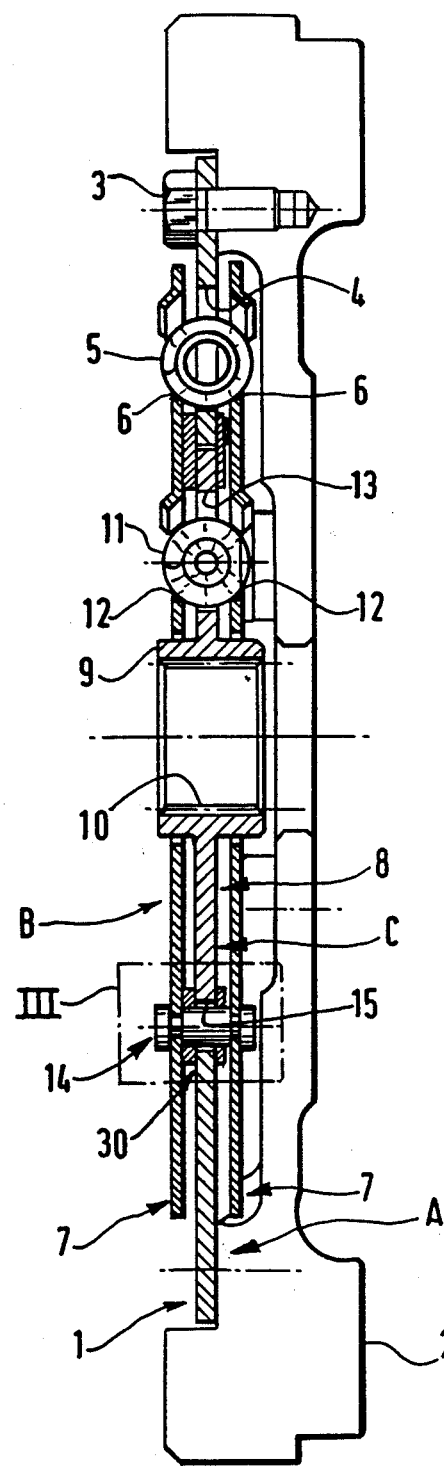
FIG. 1 is a view in axial cross-section of a torsion damping device according to the invention.

THe drawings show by way of example an application of the invention to the construction of a torsion damper for an automotive vehicle.

This damper comprises a disc 1, secured by means of screws 3 to a flywheel 2 which in turn is fixed to the crankshaft of the vehicle.

The disc 1 is provided with openings 4 for accommodating springs 5, which in this example are coil springs and which are disposed partly in the openings 4 and partly in openings 6. The openings 6 are in register with the openings 4, and are formed in two rings 7 (known as guide rings), which are arranged on either side of the disc 1.

The disc 1 forms part of a first damper part A, which is rotatably mounted with respect to a second damper part B against the action of the springs 5. The second damper part B includes the guide rings. The assembly of disc 1, springs 5 and guide rings 7 constitute a first spring damping device.

A damper or hub plate 8 is disposed coaxially with respect to the disc 1, with which it is aligned axially, and is located within the space defined axially and radially by the disc 1. The plate 8 is fixed to a hub 9, which is connected by means of splines 10 to the driving shaft for a pulley of a speed changing device.

The hub 9 is formed integrally with the damper plate 8, and the guide rings 7 are mounted freely around the hub 9. The plate 8 is part of a third damper part C, which is mounted movably with respect to the damper part B against the action of a further set of springs 11. The springs 11 are again coil springs. They are disposed partly in openings 12 formed in the guide ring 7, and partly in openings 13 formed in the plate 8 facing the openings 12.

The assembly of the guide rings 7, damper plate 8 and springs 11 constitute a second spring damping device.

The springs 11 are disposed on a pitch circle the diameter of which is smaller than on which the springs 5 are arrangeed.

Spacers, which in this example comprise bars 14, couple the guide rings 7 together at a fixed axial spacing from each other.

Figure 2:
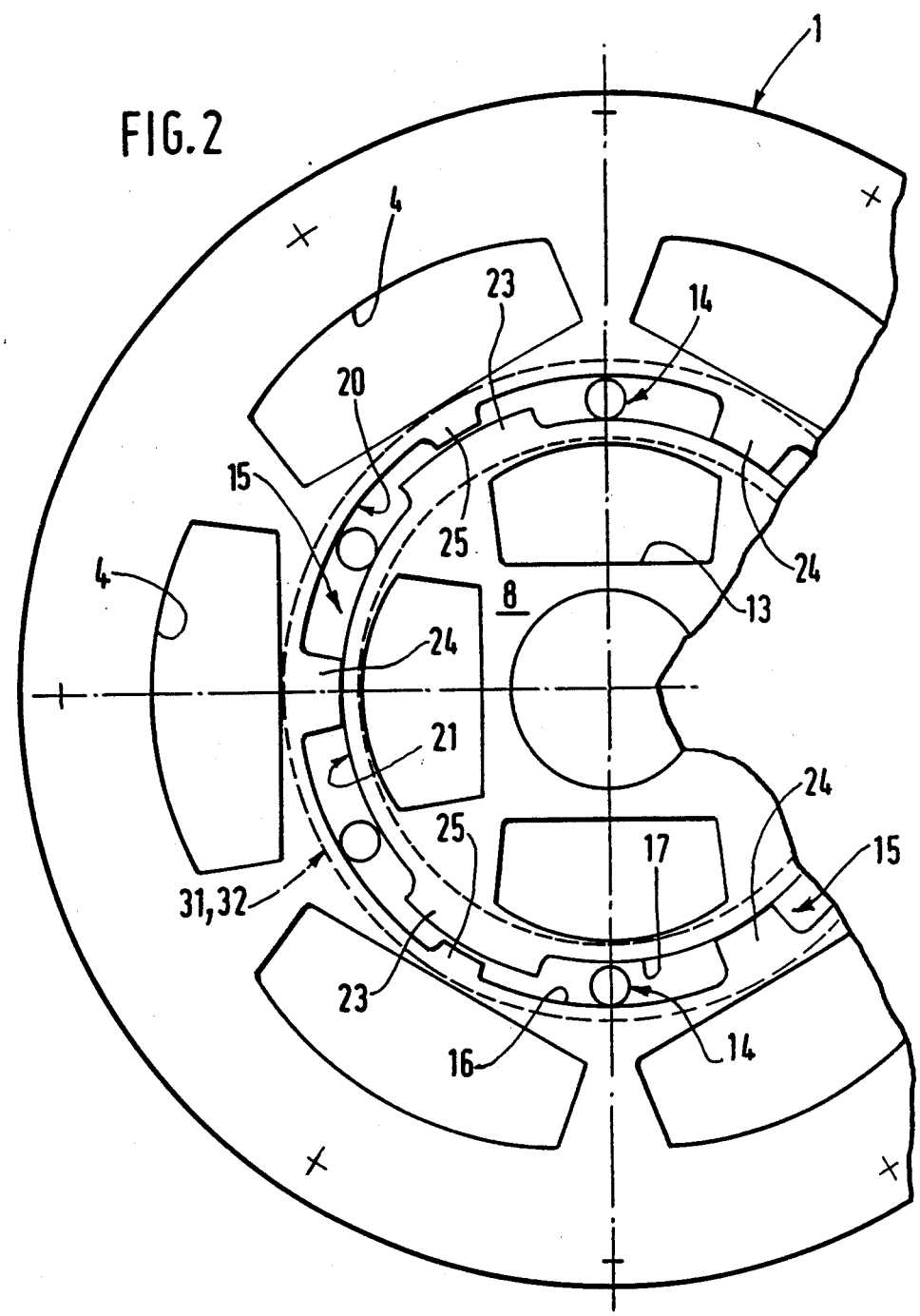
FIG. 2 is a simplified view in elevation showing part of the disc and the damper plate without the springs.

According to the invention, and as can be seen more clearly in FIG. 2, each of these spacers extends through the damper plate 8 and the disc 1, by way of an aperture 15 which is formed partly in the inner periphery 16 of the disc 1 and partly in the outer periphery 17 of the damper plate 8.

The aperture 15 is defined by a notch 20 formed in the inner periphery of the disc 1, and a notch 21 formed in the outer periphery of the damper plate 8. These notches are circumferentailly staggered with respect to each other.

The notches 21 are delimited by first pads 23, while the notches 20 are delimited by second pads 25 and third pads 24. In this example, three of the notches 21 are provided. These are spaced apart circumferentially at regular intervals, while there are six notches 20, the pads 24 being arranged alternately with the pads 23 and being offset circumferentially with respect to the latter.

More precisely, in the disc 1, between any two pads 24 there is one pad 25. The pads 25 lie radially facing the pads 23 of the plate 8, and their circumferential and radial dimensions are smaller than those of the pads 23 and 24.

As can be seen from FIG. 2, the pads 23 have a larger circumferential dimension than the pads 24, although their radial dimension is less than that of the latter. It will therefore be understood that centering of the disc 1 with respect to the plate 8 is achieved by cooperation of the pads 23 with the pads 25. In an alternative embodiment, centring may be obtained by cooperation of the pads 24 with the peripheral edge 17 of the plate 8. In the same way it will be clear from what is shown in FIG. 2 that, since each of the spacers 14 is disposed between one pad 23 and one pad 24, the pads 24 and 23 serve to limit the angular displacement between the disc 1 and the damper plate 8.

It will also be noted that the pads 25 are disposed in the middle part of the openings 4, as are the pads 24. As a result, the openings 4 can be of substantial length and close to the inner periphery 16 of the disc 1 for poisitioning reasons, on account of the flywheel 2, as seen in FIG. 1, and the disc 1 being sufficiently strong due to the addition of material at the site of any possible failure of the latter. Accordingly there are six openings 4 and four openings 13, regularly spaced apart circumferentially in each case. The pads 23 extend as far as the vicinity of the radial edges of the openings 13, and this also reinforces the mechanical strength of the plate 8. It will also be noted that the pads 23 are disposed so that they face towards the openings 4, and are circumferentially offset with respect to the corresponding openings 13, and that only two openings 4 and two openings 13 are radially aligned with each other. It is also to be noted that this arrangement of the assembly renders the damper very robust.

Six spacers 14 are also provided. These can be made to provide centring of the disc 1 with respect to the damper plate 8 in place of the pads 23 and 25, so that the pads 25 can in this case be omitted.

Figure 3:
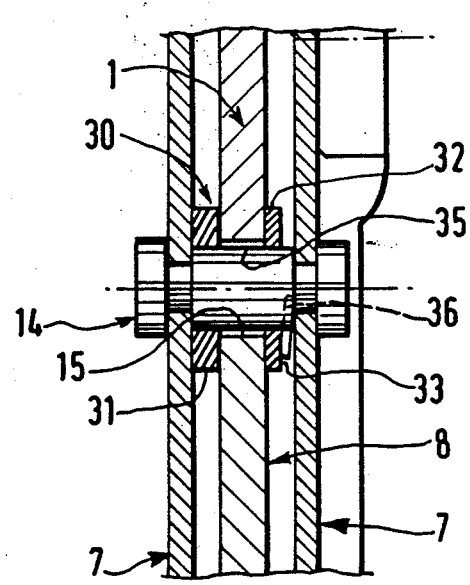
FIG. 3 is a view on a large scale showing the detail indicated in the broken lines at III in FIG. 1.

The spacers 14 carry friction means 30. See FIG. 3. These friction means, in this example, include a friction ring 31 which is inserted axially between one of the guide rings 7, the damper plate 8 and the disc 1. Another friction ring 32, which is biassed by a spring washer 33, is disposed on the other side of the assembly of disc 1 and damper plate 8, being axially located between the latter and the other guide ring 7. More precisely, the friction rings 31 and 32 are provided with openings each of which is engaged on the shank 35 of the corresponding spacer 14. The ring 33 is a resilient ring of the Belleville washer type, having openings 36 formed in its inner periphery and engaged on the corresponding spacer shank 35. This resilient ring 33 bears on the guide ring 7 and biasses the friction ring 32 axially towards the disc 1 and the plate 8 so as to bring them into engagement with the ring 31, which then acts as a spacer.

As will be understood from the foregoing, the friction means 31, 32 and 33 are common to the disc 1 and the damper plate 8, and thus serve to provide friction, both between the guide rings 7 and the disc 1, and between the guide rings 7 and the damper plate 8. The outlines of the rings 31 and 32 have been shown in broken lines in FIG. 2 for clarity. The rings 31 and 32 are so placed that they form bands of material lending rigidity to the structure and closing off the openings 4 and 13.

In another embodiment, not shown, two friction means may be provided, dissociated from each other, and associated repectively with the plate 8 with the disc 1. In this case, the rings associated with the disc 1 will be engaged by means of their inner periphery, in notches formed on the studs of the spacers, while the rings associated with the damper plate will be engaged by their outer periphery in notches formed in the studs of the spacers 14. There will then be a head to tail relationship between the Belleville washers associated with each of the friction means.

Figure 4:
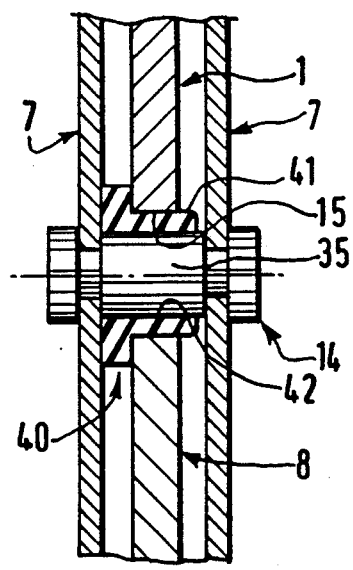
FIG. 4 is a view similar to FIG. 3, but shows another embodiment.
Figure 5:
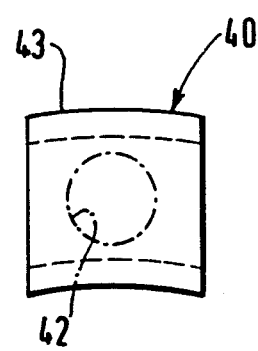
FIG. 5 is a view of the head of a bush used in the arrangement shown in FIG. 4.

In a further embodiment, shown in FIGS. 4 and 5, each spacer 14 carries a bush 40 with a rectangular head. The bushes 40 may be of fibre reinforced synthetic material.

Each bush 40 has a shank 41 which extends through the aperture 15 and which is engaged by means of its central bore 42 on the shank 35 of the corresponding spacer 14. The bush shank 41 has at one of its ends a radially enlarged head 43 which is inserted axially between one of the guide rings 7 and the transverse assembly of disc 1 and damper plate 8. This head 43 is rectangular in shape, which allows the zones of contact of the stud with the corresponding guide ring 7, disc 1 and plate 8 to be increased.

Advantageously, the bushes 40 are arranged alternately, that is to say, considering two successive bushes, the head 43 of one of them is inserted axially between one of the guide rings 7 and the assembly of disc 1 and plate 8, while the head of the other bush is inserted axially between the other guide ring 7 and the assembly of disc 1 and plate 8. Then one of the heads 43 takes the place of a ring 31, while the other takes place of a ring 32. The resilient ring 31 can then be located around the hub 9. In this case, the bush shanks 41 may serve as means for centring and guiding the disc 1 with respect to the plate 8.

The stiffnesses of the springs 5 and 11 are of the same order of magnitude, so that the device functions in all cases in the following way. In the mode of operation known as "driving", the disc 1 is displaced with respect to the guide rings 7, and is coupled to the damper plate 8 through the springs 5 and 11, which, being mounted in series, are additive in effect. During the angular displacement between the disc 1 and the plate 8, there can therefore be simultaneous contact of the spacers 14 with the pads 24 and 23. It can however be arranged that the pads 24 come into contact with the spacers 14 before the latter come into contact with the pads 23. To this end, it is sufficient, for example, that the springs 11 should be slightly less stiff than the springs 5. The springs 11 will then act by themselves during a small part of the angular displacement between the disc 1 and damper plate 8. By giving the springs 5 a slightly smaller stiffness than the springs 11, the reverse is of course possible. All this depends on the position which the spacers 14 occupy in the "rest" position with respect to the pads 24 and 23, as well as on the stiffness of the springs 5 and 11 mounted in series.

As will be apparent from this description, the disc 1 and the damper plate 8 are of the same thickness. The guide ring 7 may of course be fixed to the hub 9, while the damper plate 8 may be mounted freely around the hub 9.

The bushes 40 made of synthetic material may have a head with different additives from those of its shank, such that a given bush may have a coefficient of friction which is adapted for centring the disc with respect to the plate, as well as a coefficient of friction which is appropriate for the friction contact between the disc and the plate themselves.

The enlarged head of each bush 40 may be in the form of a trapezium.

In further embodiment, the friction ring 32 may be made of synthetic material, and be provided with tongues which are resiliently deformable so as to perform the function of the ring 33. The ring 33 may not be carried by the spacers, and may be located around the hub, in such a way that the spacers only partly carry the friction means.

The spacers may consist of plates as described in French Patent. No. 2,361,575, or they may project from one of the guide rings and placed on the other guide ring as described in U.S. Pat. No. 3,995,726.

This torsion damper may be part of a friction clutch assembly. The disc 1 carries in this case friction clutch pads. The springs can be formed of blocks of resiliently deformable material.

Finally, the disc 1 may be fixed to the input part, usually carrying the starter ring, of a double flywheel damper, the damper plate being in this case connected to the output part of the flywheel damper forming a reaction plate for the clutch.

What we claim is:

1. A torsion damper, particularly for automotive vehicles, of the kind comprising a disc connected to a pair of guide rings (7) by means of a first spring damping device provided with a first set of springs (5) disposed partly in first openings (4) formed in the disc (1) and partly in openings (6) formed in the guide rings (7), and a damper or hub plate (8) which is connected to said guide rings by means of a second damping device provided with a second set of springs (11) disposed, on one hand, on a pitch circle having a diameter of which is smaller than that of which the first springs (5) are arranged, and on the other hand, partly in openings (12) formed in the guide ring (7), and partly in second openings (13) formed in the hub plate (8), with the damper plate being mounted coaxially with respect to said disc and located within the space defined radially by the disc (1), and said guide rings being connected to each other by means of spacers (14) each having a shank and passing through passage means (15) formed in said disc and said damper plate, wherein said passage means comprises, in respect of each of said spacers, a notch (20) formed in the inner periphery of said disc and a notch (21) formed in the outer periphery of the damper plate and wherein said notches are offset circumferentially with respect to each other and are disposed on a pitch circle the diameter of which is smaller than that of which the first springs (5) are arranged and greater than that of which the second springs (11) are arranged.

2. A torsion damper according to claim 1, wherein said notches (21) in the damper plate are delimited by first pads (23) disposed opposite second pads (25) which party delimit the notches (20) formed in said disc.

3. A torstion damper according to claim 2, wherein the second pads (25) are arranged alternatively with thirds pads (24) having a larger radial dimension than the second pads, each of the notches in the disc being defined between a said second pad and a said third pad.

4. A torsion damper according to claim 3, wherein said second pads (25) of the disc having circumferential and radial dimensions smaller than those of the first pads of the damper plate, with each said second pad being disposed radially in register with a central portion of a respective one of the said first openings, the first openings being offset circumferentially with respect to the said second openings.

5. A torsion damper according to claim 1, wherein the spacers carry friction means associated with the disc and with the damper plate, said friction means serving to provide friction between the guide rings (7) and the disc (1) and between the guide rings (7) and the damper plate (8), comprising a ring, carried by an opening therein on the shank of the corresponding spacer and disposed axially between one of the guide rings and the coaxial assembly of the disc and damper plate, the friction means further comprising another ring, having an opening therein by which it is carried on the shank of the corresponding spacer, and disposed axially between said coaxial disc and hub plate and the other guide ring, and an elastic ring bearing on the other guide ring and carried on the shank of the corresponding spacer, whereby the elastic ring acts on said other ring of the friction means.

6. A torsion damper according to claim 5, wherein said friction means include at least two bushes having an enlarged head, each of said bushes being carried on the shank of a corresponding one of said spacers, with one of the heads being in frictional contact with one of the guide rings while the other one of said heads is in frictional contact with the other guide ring.

* * * * *